United States Patent
Fan et al.

(10) Patent No.: US 9,654,725 B2
(45) Date of Patent: May 16, 2017

(54) VIDEO PROCESSING METHOD, VIDEO DISPLAYING METHOD AND VIDEO PROCESSING DEVICE

(71) Applicant: VATICS INC., New Taipei (TW)

(72) Inventors: Je-Lung Fan, New Taipei (TW); Tsai-Fong Wu, New Taipei (TW)

(73) Assignee: VATICS INC., New Taipei (TW)

( * ) Notice: Subject to any disclaimer, the term of this patent is extended or adjusted under 35 U.S.C. 154(b) by 446 days.

(21) Appl. No.: 14/290,647

(22) Filed: May 29, 2014

(65) Prior Publication Data

US 2014/0354882 A1    Dec. 4, 2014

(30) Foreign Application Priority Data

May 31, 2013 (TW) .............................. 102119512 A (51) Int. Cl.
| | | |
|---|---|---|
| H04N 7/00 | (2011.01) | |
| H04N 7/01 | (2006.01) | |
| H04N 19/172 | (2014.01) | |
| H04N 19/132 | (2014.01) | |
| H04N 19/146 | (2014.01) | |
| H04N 19/162 | (2014.01) | |
| H04N 19/17 | (2014.01) | |

(52) U.S. Cl.
CPC ......... *H04N 7/0127* (2013.01); *H04N 19/132* (2014.11); *H04N 19/146* (2014.11); *H04N 19/162* (2014.11); *H04N 19/17* (2014.11); *H04N 19/172* (2014.11)

(58) Field of Classification Search
CPC ........................... H04N 7/0127; H04N 19/132
USPC ......................................................... 348/148
See application file for complete search history.

(56) References Cited

U.S. PATENT DOCUMENTS

| | | |
|---|---|---|
| 7,321,624 B1 | 1/2008 | Allmen et al. |
| 2006/0204113 A1 | 9/2006 | Wang et al. |
| 2006/0238445 A1 | 10/2006 | Wang et al. |
| 2013/0251031 A1 | 9/2013 | Yitschak et al. |
| 2014/0132789 A1* | 5/2014 | Koyama ................. G06T 13/80 348/218.1 |

OTHER PUBLICATIONS

Wei Lai et al., A Region Based Multiple Frame-Rate Tradeoff of Video Streaming, International Conference on Image Processing (ICIP), 2004, p. 2067-2070.
Holger Meuel et al., Low Bit Rate ROI Based Video Coding for HDTV Aerial Surveillance Video Sequences, Germany.

* cited by examiner

*Primary Examiner* — Jeffery Williams
(74) *Attorney, Agent, or Firm* — Maschoff Brennan (57) ABSTRACT

A video processing method, a video displaying method, and a video processing device are provided. The video processing device performs the video processing method and the video displaying method. The video processing method includes the following steps. First, receive a full frame according to a global frame rate. Then, according to a first local frame rate different from the global frame rate, determine whether to capture a first local frame from the global frame. Finally, combine the first local frame and the global frame to generate a synthesized frame. The video processing method, the video displaying method and the video processing device produce better quality and smaller file size of image data.

20 Claims, 8 Drawing Sheets

FIG.8

VIDEO PROCESSING METHOD, VIDEO DISPLAYING METHOD AND VIDEO PROCESSING DEVICE

CROSS-REFERENCE TO RELATED APPLICATIONS

This non-provisional application claims priority under 35 U.S.C. §119(a) on Patent Application No(s). 102119512 filed in Taiwan, R.O.C. on May 31, 2013, the entire contents of which are hereby incorporated by reference.

TECHNICAL FIELD

The disclosure relates to a video processing method, a video displaying method, and a device therefor, more particularly to a video processing method, a video displaying method, and a video processing device for synthesized frames.

BACKGROUND

Computer products in our daily life are more progressive in technological progress. Over the years, this trend also affects the development of vehicle installations a lot. Therefore, many kinds of technology products related to driving safety and driving convenience are developed one by one. One of them is the event data recorder (EDR).

The EDR is a device which is installed in a vehicle to record image information about driving the vehicle to generate video files. Through these video files, the reasons of accidents or any unpredictable events or the liability attribution may be clarified. Therefore, the event data recorder has become very common to many drivers.

However, the high image quality, large storage space and long recording time of the event data recorder are being pursued. In the art, the event data recorder is designed to own a high resolution to record video data (or called image data) to generate video files. However, while the resolution increases, a video file will occupy more storage space and the available recording time of the event data recorder will decrease. In contrast, if recording video data is based on a too low resolution, the video file will has a low image quality (i.e. the image will be blurred), resulting in that users are not able to clearly watch desired video segments at some critical junctures.

To resolve such as problem, some event data recorders are designed to own a high compression ratio to store video files. For such an event data recorder, if the compression ratio is too high, the image quality of the stored video file will decrease. However, if the compression ratio is adjusted from high to low, the video file will occupy more storage space as well as the available recording time will decrease.

Therefore, it is very important for event data recorders nowadays to find out the balance between the image quality and the size of the video file, resulting in that while the image quality of the event data recorder allows users to clearly observe content shown on screen, the size of the video file is not too large to decrease the available recording time.

SUMMARY

According to one or more embodiments, the disclosure provides a video processing method. In one embodiment, the video processing method may include the following steps. First, receive a global frame (or called global frame) according to a global frame rate (or called global frame rate). Then, according to a first local frame rate different from the global frame rate, determine whether to capture a first local frame from the global frame. Finally, combine the first local frame and the global frame to generate a synthesized frame. In one embodiment, when to capture the first local frame from the global frame is determined by the first local frame rate, image data in the global frame may be captured and become the first local frame according to a first local region of the first local frame. Alternately, when not to capture the first local frame from the global frame is determined by the first local frame rate, the first local frame may be maintained. In one embodiment, the first local region may be smaller than or equal to a full region of the global frame. In one embodiment, to combine the first local frame and the global frame to generate the synthesized frame may be based on the first local region and the full region. In one embodiment, before the first local frame and the global frame are combined, the video processing method may further include, according to a second local frame rat, determining whether to capture a second local frame from the global frame. When to capture the second local frame from the global frame is determined, image data corresponding to a second local region of the second local frame may be captured and become the second local frame. The synthesized frame may be generated by combining the first local frame, the second local frame, and the global frame.

According to one or more embodiments, the disclosure provides another video processing method. In one embodiment, the video displaying method may include the following steps. First, according to a global frame rate, receive a global frame with a full region. Then, according to the global frame rate, display a synthesized frame which has a first local frame with a first local frame rate and a first local region. The first local frame rate may be different from the global frame rate. The synthesized frame may be generated according to the first local region and the full region.

In one embodiment, the step of displaying the synthesized frame according to the global frame rate may include the following steps. First, by the first local frame rate, determine whether to capture the first local frame from the global frame. Then, combine the first local frame and the global frame to generate the synthesized frame. Finally, display the synthesized frame. When to capture the first local frame is determined by the first local frame rate, the image data corresponding to the first local region may be captured from the global frame and become the first local frame. In one embodiment, the step of combining the first local frame and the global frame to generate the synthesized frame may be based on the first local region and the full region.

In one embodiment, the step of generating the synthesized frame according to the first local region and the full region may further include the following steps. First, according to the second local frame rate, determine whether to capture the second local frame from the global frame. When to capture the second local frame from the global frame is determined, image data corresponding to a second local region of the second local frame may be captured from the global frame and become the second local frame. In one embodiment, the synthesized frame may be generated by combining the first local frame, the second local frame, and the global frame.

According to one or more embodiments, the disclosure provides a video processing device. In one embodiment, the video processing device may include a video capturing device for capturing an global frame; a processor for combining the global frame and a first local frame to generate a synthesized frame according to a first local frame rate; a buffer for receiving image data which corresponds to the first local frame, from the processor and storing the image data; and a displayer for displaying the synthesized frame. In one embodiment, when the processor, by the first local frame rate, determines to capture the first local frame, the image data corresponding to a first local region may be captured from the global frame and become the first local frame and may store the image data in the buffer. In one embodiment, when the processor combines the first local frame and the global frame to generate the synthesized frame, the processor may read the image data corresponding to the first local frame from the buffer and may combine the image data and the global frame to generate the synthesized frame.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides a video processing method, a video displaying method, and a video processing device. The video processing device may be a webcam system, an event data recorder (EDC), or any possible apparatus capable of performing the video processing method and the video displaying method in the disclosure. Furthermore, the video processing device may be applied to monitor or observe what occurs in an office, a street, or a square.

Figure 1:
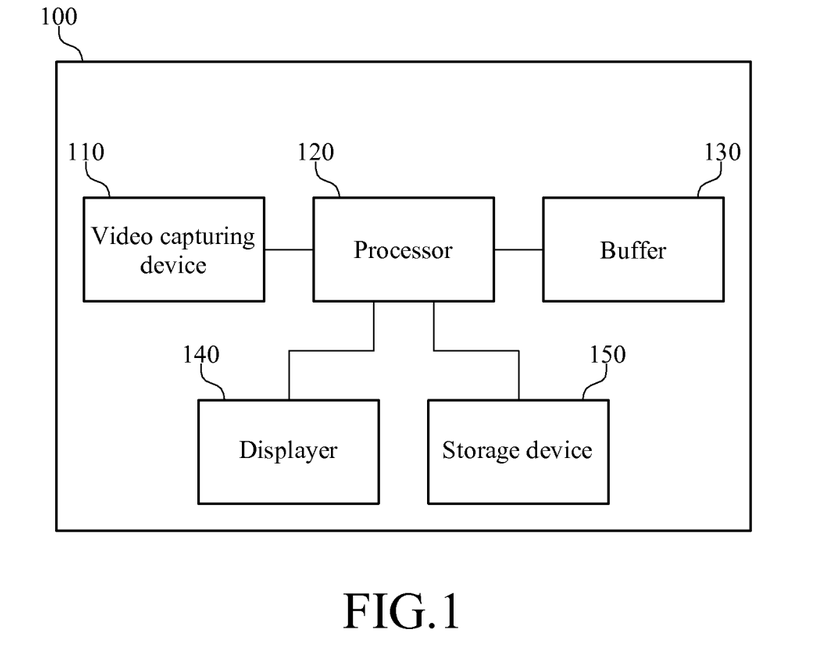
FIG. 1 illustrates a video processing device in one embodiment.

Referring to FIG. 1, a video processing device 100 is illustrated. The video processing device 100 may include a video capturing device 110, a processor 120, a buffer 130, a displayer 140, and a storage device 150. The video capturing device 110, the buffer 130, the displayer 140, and the storage device 150 may couple with the processor 120.

The video capturing device 110 may capture a global frame. The video capturing device 110 may be a webcam, an optical camera, or other device capable of capturing image data. The global frame may be n full-screen image data captured by the video capturing device 110. The video capturing device 110 may capture 30 or 60 global frames per second (i.e. the global frame rate), but the disclosure will not be limited thereto.

The processor 120 may determine whether to capture a first local frame from the global frame, according to a first local frame rate and may combine the global frame and the first local frame to generate a synthesized frame. The location of the first local frame and the location of other local frame in the full-screen image data may be preset by users, be a default setting, or be set during capturing frames. The unit of the local frame rate may be frames per second (fps). For example, 30 fps indicates 30 pieces of image data are captured per second. Each local frame rate may be preset by users, be a default value in the system, or be set during capturing frames. The processor 120 may be a central processing unit (CPU) or a graphics processing unit (GPU). Moreover, the better graphic processing and operating performance the processor 120 has, the shorter the time spent on processing and operating data will be.

The buffer 130 may receive image data corresponding to the first local frame from the processor 120 and then store the image data. The buffer 130 may be a synchronous dynamic random access memory (SDRAM) or an electrically erasable programmable read only memory (EEPROM). The buffer 130 with a smaller volume and a fast accessing speed may be good to reduce the volume of the video processing device 100 and enhance the performance of the video processing device 100.

The displayer 140 may display the synthesized frame. The displayer 140 may be a touch control Panel or a liquid crystal displayer. The displayer 140 with a higher image quality may display users' exquisite frames.

The storage device 150 may store video files including synthesized frames generated by the processor 120. The storage device 150 may be a flash memory card or a solid state disk (SSD). The storage device 150 with a larger capacity and a better anti-vibration may allow the video processing device 100 to store more image data and/or image data with longer time length and may be more durable.

Figure 2:
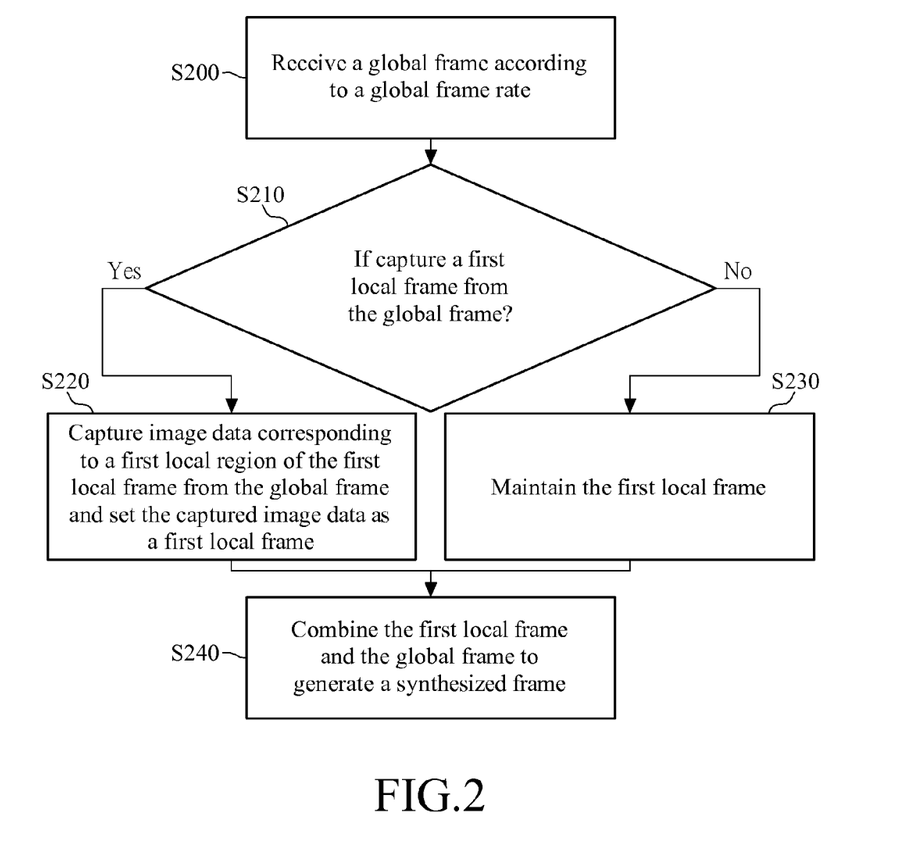
FIG. 2 is a flow chart of a video processing method in one embodiment.

The above processor 120 may perform a video processing method. FIG. 2 is a flow chart of a video processing method in one embodiment. The video processing method may include the following steps. First, as shown in step S200, receive a global frame according to a global frame rate. Then, as shown in step S210, determine whether to capture a first local frame, according to a first local frame rate different from the global frame rate. If yes, image data corresponding to a first local region of the first local frame may be captured from the global frame and become a first local frame, as shown in step S220; otherwise, the first local frame may be maintained, as shown in step S230. Finally, as shown in step S240, combine the first local frame and the global frame to generate a synthesized frame.

In step S200, the video capturing device 110 may receive the global frame according to the global frame rate set in the processor 120. The global frame may be a full-screen frame captured by the video capturing device 110, and the global frame rate may be used for define a number of global frames that the video capturing device 110 captures. For example, the global frame rate may be 30 fps indicating that the video capturing device 110 captures 30 global frames per second. The higher the global frame rate is, the smoother and more fluent the screen will be. The global frame rate may be preset according to the status of system and hardware by users.

Figure 4:
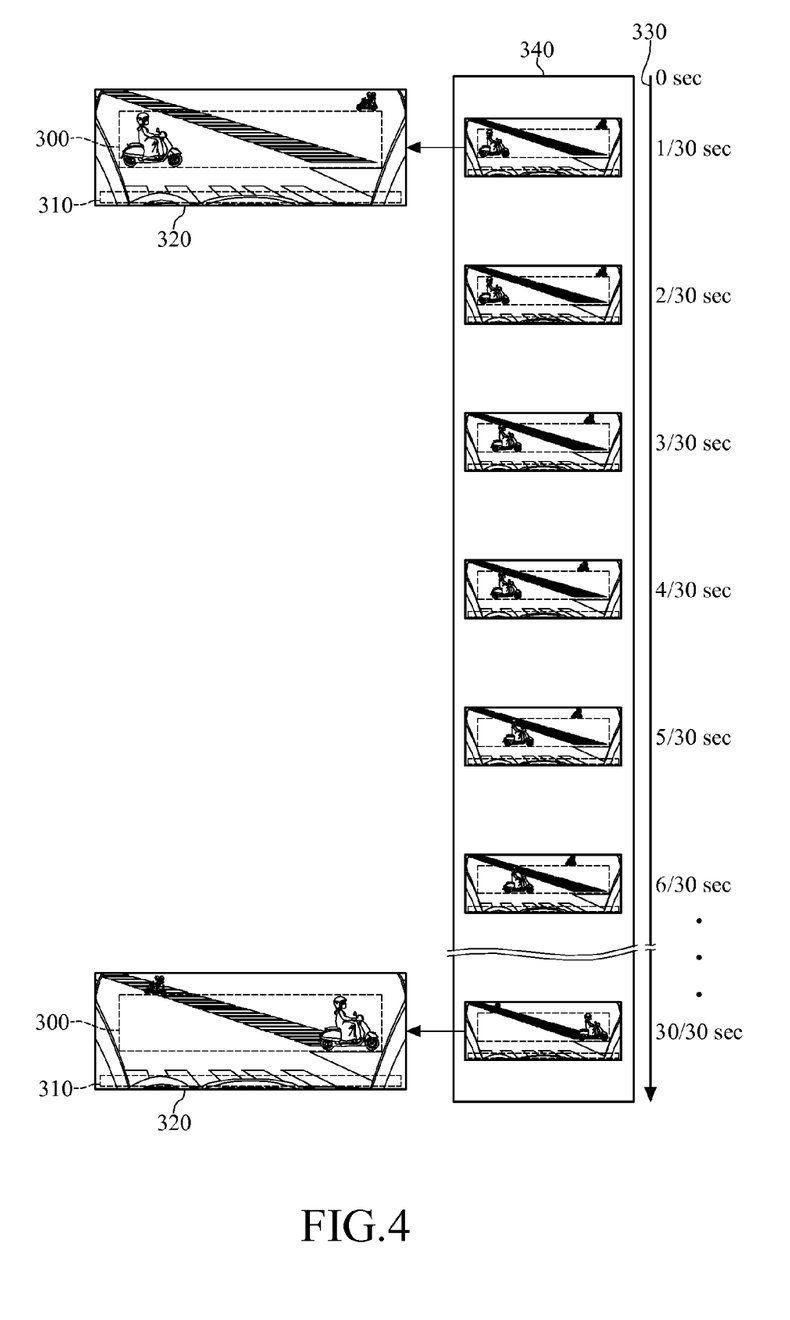
FIG. 4 illustrates a schematic example in one embodiment.

In step S210, the video capturing device 110 may, according to a local frame rate set in the processor 120, determine whether to capture image data corresponding to the first local frame. The local frame is a region of interest (ROI) captured from the global frame, and the location of the local frame may be preset by users, be a default setting, or be set during capturing frames. Referring to FIG. 4, a first local frame 300 and a second local frame 310 are respectively the first local frame and the second local frame, and the frame 320 is the global frame, and a local frame rate is the frame rate of the local frame. The local frame rate may be different from the global frame rate, that is, the local frame rate may be higher than or lower than the global frame rate. The local frame rate may be preset by users, be a default value, or be set during capturing frames. The first local frame may have a first local region, and the first local region may be smaller than or equal to the full region of the global frame.

When to capture image data corresponding to the first local frame is determined according to the local frame rate in step S210, the processor 120 in step S220 may control the video capturing device 110 according to a first local region of the first local frame to capture image data in the first local region and set the captured image data as the first local frame, and then store the image data of the first local frame in the buffer 130. When not to capture image data corresponding to the first local frame is determined according to the local frame rate in step S210, the processor 120 in step S230 may not control the video capturing device 110 to capture the image data in the first local region but maintain the image data of the first local frame in the buffer 130.

Finally, in step S240, to combine the first local frame and the global frame to generate the synthesized frame may be based on the first local region and the full region. Specifically, the processor 120 may read the image data of the first local frame from the buffer 130 and then combine the image data of the first local frame and the image data of the global frame to generate the synthesized frame. After generating the synthesized frame, the processor 120 may selectively send the synthesized frame to the displayer 140 and store the synthesized frame in the storage device 150.

Figure 3:
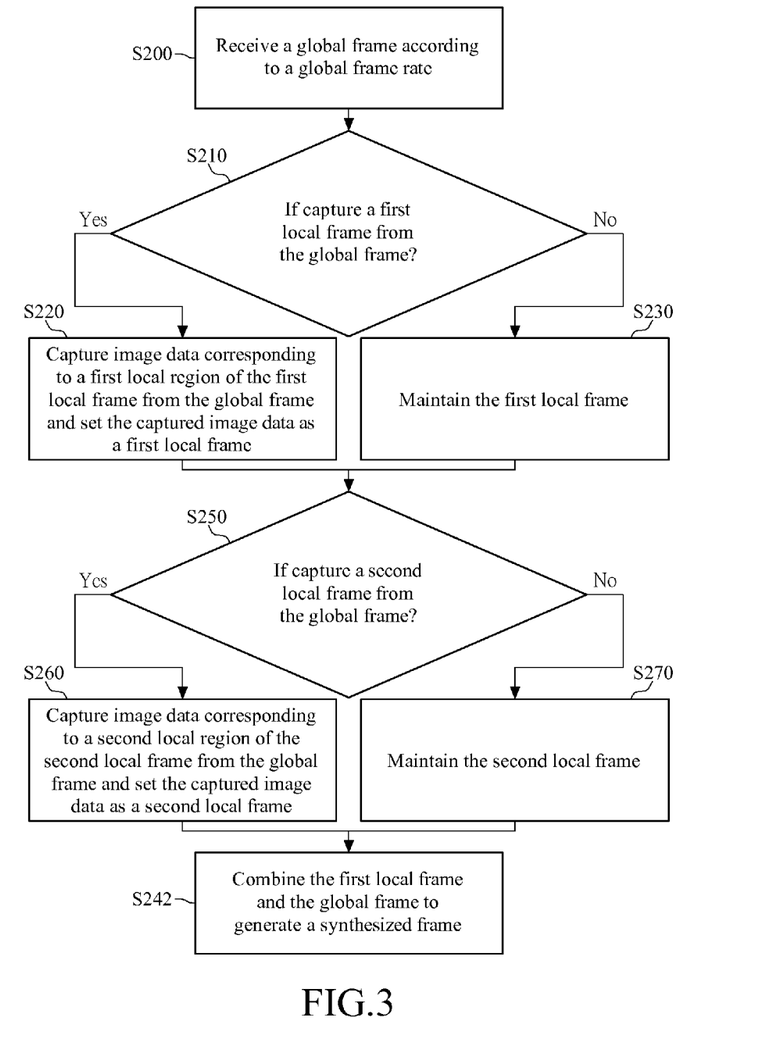
FIG. 3 is a flow chart of another video processing method in one embodiment.

FIG. 3 is a flow chart of another video processing method in one embodiment. Before step S240 where the first local frame and the global frame are combined to generate the synthesized frame is performed, the video processing method may further include the following steps. First, according to a second local frame rate, determine whether to capture a second local frame from the global frame, as shown in step S250. The second local frame rate may be different from the global frame rate. If yes, image data corresponding to a second local region from the global frame may be captured and become the second local frame, as shown in step S260; otherwise, the second local frame may be maintained, as shown in step S270. Then, the first local frame, the second local frame, and the global frame may be combined to generate the synthesized frame, as shown in step S242.

The operation of steps S250, S260 and S270 may respectively be similar to the operation of steps S210, S220 and S230 and are not repeated hereinafter. The amount of local frames and the size and location of each local frame may be set according to actual requirements. The image quality of the first local frame and the image quality of the second local frame may be the same or different. In this way, the local frame with a higher image quality may be applied to an image region to be clearly captured. On the other hand, since image data with a lower image quality needs smaller space, the image quality of the first local frame and the image quality of the second local frame may be set according to the size of the storage space. To set the image quality according to the storage space may save the storage space or may cause the storage space to be used efficiently. The setting of image quality may be based on quantization parameters defined by an international universal compression standard, such as the video codec standard H.264, the motion picture expert group 4 (MPEG-4) or the joint photographic expert group (JPEG).

In step S242 in FIG. 3, to combine the first local frame, the second local frame, the global frame to generate the synthesized frame may be based on the first local region, the second local region, and the full region. The processor 120 may read image data of the first local frame from the buffer 130 and then combine the image data of the first local frame, the image data of the second local frame, and the image data of the global frame to generate the synthesized frame. During the combining, the processor 120 may insert the image data corresponding to the global frame, the first local frame, and the second local frame according to the order of the global frame, the first local frame and the second local frame. Moreover, step S242 may be the detailed operation of step S240. The amount of local frames may be set according to user's actual requirements. In this embodiment, only the first and second local frames are taken as an example to clearly describe the disclosure. In some embodiments, more than two local frames may be taken.

Take an example where there are a first local frame 300, a second local frame 310, a global frame 320, a time line 330, and a video composition 340, as shown in FIG. 4. For example, the global frame rate of the global frame 320 may be 30 fps, the first local frame rate of the first local frame 300 may be 15 fps, and the second local frame rate of the second local frame 310 may be 10 fps.

In the following exemplary embodiment, the video processing method may be illustrated along the time line 330. The first local region may be marked with a dotted-line in the first local frame 300, and the second local region may be marked with a dotted-line in the second local frame 310. In this embodiment, the first local frame 300 and the second local frame 310 may be rectangular. However, in some embodiments, the first local frame 300 and the second local frame 310 may be irregular-shaped. The full region of the global frame 320 may be the entire region that the video capturing device 110 captures image data of the global frame 320. The video composition 340 may show image data made up of many pictures, and each picture is a captured frame along the time line 330. In this embodiment, one thirtieth of a second may be taken as an interval between two frames in the video composition 340. That is, one captured frame in the video composition 340 may be obtained every one thirtieth of a second.

First, when starting recording image data, the video capturing device 110 may simultaneously capture image data of the first local frame 300, the second local frame 310 and the global frame 320 and then send the image data of the first local frame 300, the second local frame 310 and the global frame 320 to the processor 120. After the processor 120 receives the image data of the first local frame 300, the second local frame 310 and the global frame 320, the processor 120 may store the image data of the first local frame 300, the second local frame 310 and the global frame 320 in the buffer 130. Also, the processor 120 may combine the image data of the first local frame 300, the second local frame 310 and the global frame 320 to generate an initial synthesized frame.

Then, at one thirtieth of a second, there may be a next captured frame (or called first captured frame) in the video composition 340. Since the first local frame rate of the first local frame 300 is set to be 15 fps and the second local frame rate of the second local frame 310 is set to be 10 fps, these setting may not match the determination conditions in steps S210 and S250. In other words, a first time point related to the first local frame rate and a second time point related to the second local frame rate do not match a system time point related to the global frame rate. The first time point is the timing that the first local frame is refreshed according to the first local frame rate. The second time point is the timing that the second local frame is refreshed according to the second local frame rate. The system time point is the timing that one global frame is refreshed according to the global frame rate. Herein, the video capturing device 110 may not capture or capture the image data of the first local frame 300 and the second local frame 310 at one thirtieth of a second. However, the global frame rate of the global frame 320 is set to be 30 fps, and then the video capturing device 110 may capture the image data of the global frame 320 at one thirtieth of a second and send the image data of the global frame 320 at one thirtieth of a second to the processor 120.

While receiving the image data of the global frame 320 at one thirtieth of a second, the processor 120 may delete initial image data of the global frame 320, which is obtained when the video recording starts, in the buffer 130 and may store the image data of the global frame 320 at one thirtieth of a second in the buffer 130. Then, the processor 120 may read the initial image data of the first local frame 300 and the second local frame 310, which is obtained when the video recording starts, from the buffer 130 and combine the read initial image data and the image data of the global frame 320 at one thirtieth of a second to generate a synthesized frame at one thirtieth of a second.

Then, the time line 330 proceeds to two thirtieth of a second, there may be a next captured frame (or called second captured frame) next to the captured frame at one thirtieth of a second in the video composition 340. Two thirtieth of a second matches the determination condition in step S210 (that is, the first time point matches the system time point), so the video capturing device 110 may capture the image data of the first local frame 300 at two thirtieth of a second. Since two thirtieth of a second matches the global frame rate of the global frame 320, the video capturing device 110 may also capture the image data of the global frame 320 at two thirtieth of a second. Then, the video capturing device 110 may send the image data of the first local frame 300 and the global frame 320 at two thirtieth of a second to the processor 120. However, two thirtieth of a second does not match the determination condition against the second local frame 310 in step S250 (that is, the second time point does not match the system time point) such that the image data may not be sent to the processor 120.

While the processor 120 receives the image data of the first local frame 300 and the global frame 320 at two thirtieth of a second, the processor 120 may delete the initial image data of the first local frame 300 and the image data of the global frame 320 at one thirtieth of a second from the buffer 130 and may store the image data of the first local frame 300 and the global frame 320 at two thirtieth of a second in the buffer 130. Then, the processor 120 may combine the image data of the first local frame 300 and the global frame 320 at two thirtieth of a second and the image data of the second local frame 310 read from the buffer 130 at one thirtieth of a second to generate a synthesized frame at two thirtieth of a second.

The time line proceeds to three thirtieth of a second, and a third captured frame in the video composition 340 may be obtained. Since three thirtieth of a second matches the determination condition in step S250 (that is, the second time point matches the system time point), the video capturing device 110 may capture the image data of the second local frame 310 at three thirtieth of a second. Also, three thirtieth of a second matches the global frame rate of the global frame 320, the video capturing device 110 may also capture the image data of the global frame 320 at three thirtieth of a second. Then, the video capturing device 110 may send the image data of the second local frame 310 and the global frame 320 at three thirtieth of a second to the processor 120.

While receiving the image data of the second local frame 310 and the global frame 320 at three thirtieth of a second, the processor 120 may delete the image data of the global frame 320 at two thirtieth of a second and the initial image data of the second local frame 310 from the buffer 130 and may store the image data of the second local frame 310 and the global frame 320 at three thirtieth of a second in the buffer 130. Subsequently, the processor 120 may read the image data of the second local frame 310 and the global frame 320 at three thirtieth of a second and the image data of the first local frame at two thirtieth of a second read from the buffer 130 and then combine them to generate a synthesized frame at three thirtieth of a second. In this embodiment, the first local frame 300 and the second local frame 310 are taken as an example to clearly describe the disclosure, but in some embodiment, more than two local frames may be taken. The image quality of the first local frame 300 and the image quality of the second local frame 310 may be the same or different. When the image quality of the first local frame 300 and the image quality of the second local frame 310 are different, these different image qualities may be applied to perform video capturing. Accordingly, a local frame with a higher image quality may be applied to an image region to be clearly captured. On the other hand, the lower the image quality is, the smaller the storage space needs. The image quality of the first local frame 300 and the image quality of the second local frame 310 may further be set according to the storage space whereby the storage space may be saved or efficiently used. The setting of image quality may be based on quantization parameters of an international universal compression standard such as H.264, MPEG-4, and JPEG.

If the storage space of the video capturing device 110 is finite, since a high image quality only allows a sort recording time, the video capturing device 110 has to decrease the image quality to extend the available recording time. The first local frame 300 may be used for recording driving states on the road, and the second local frame 310 may be used for recording states in the vehicle. Since the first local frame 300 is usually more important than the second local frame 310, the video capturing device 110 may maintain the image quality of the first local frame 300 but reduce the image quality of the second local frame 310. In this way, the video file may occupy smaller storage space whereby the available recording time may be extended.

Figure 5:
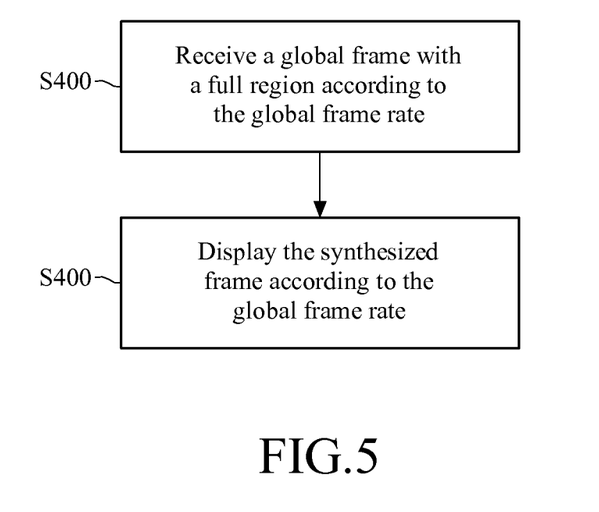
FIG. 5 is a flow chart of a video displaying method in one embodiment.

In one embodiment, the processor 120 may also perform another video displaying method as shown in FIG. 5. The video displaying method may include the following steps. First, as shown in step S400, according to the global frame rate, receive a global frame with a full region. Then, as shown in S500, display the synthesized frame according to the global frame rate. The synthesized frame may include a first local frame with a first local region and a first local frame rate different from the global frame rate. The synthesized frame may be generated by combining the first local region and the full region.

Take an example as shown in FIG. 4. First, the video capturing device 110 may capture image data of the first local frame 300, the second local frame 310 and the global frame 320 according to the first local frame rate and first local region of the first local frame 300, the second local frame rate and second local region of the second local frame 310, and the global frame rate and full region of the global frame 320. Next, the processor 120 may combine the image data of the first local frame 300, the second local frame 310 and the global frame 320 to generate a synthesized frame, and send the synthesized frame to the displayer 140 for displaying it.

Figure 6:
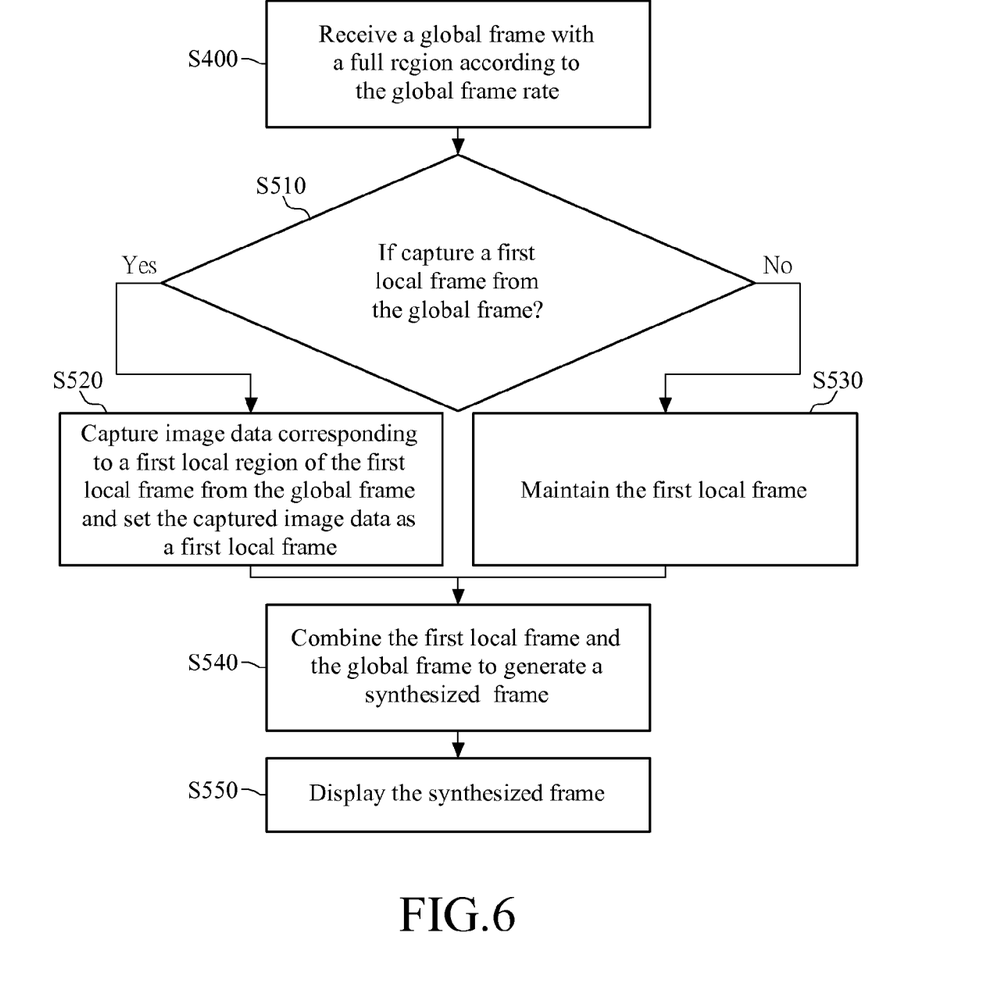
FIG. 6 is a flow chart of other video displaying method in one embodiment.

FIG. 6 is a flow chart of other video displaying method in one embodiment. To display the synthesized frame according to the global frame rate, as shown in step S500, may include the following steps. First, as shown in step S510, determine whether to capture the first local frame from the global frame, by the first local frame rate. When to capture the first local frame from the global frame is determined by the first local frame rate, image data corresponding to the first local region may be captured from the global frame and become the first local frame, as shown in step S520. In contrast, when not to capture the first local frame from the global frame is determined by the first local frame rate, the first local frame may be maintained, as shown in step S530. Next, combine the first local frame and the global frame to generate the synthesized frame, as shown in S540. Finally, display the synthesized frame, as shown in step S550. To combine the first local frame and the global frame to generate the synthesized frame may be based on the first local region and the full region.

On the other hand, steps S510, S520, S530 and S540 in FIG. 6 may respectively be similar to steps S210, S220, S230 and S240 in FIG. 2 and thus are not repeated hereinafter. In step S550, the processor 120 may send the synthesized frame to the displayer 140 for displaying it and store the synthesized frame in the storage device 150. Alternately, the processor 120 may only send the synthesized frame to the displayer 140 for displaying it but not store the synthesized frame in the storage device 150.

Figure 7:
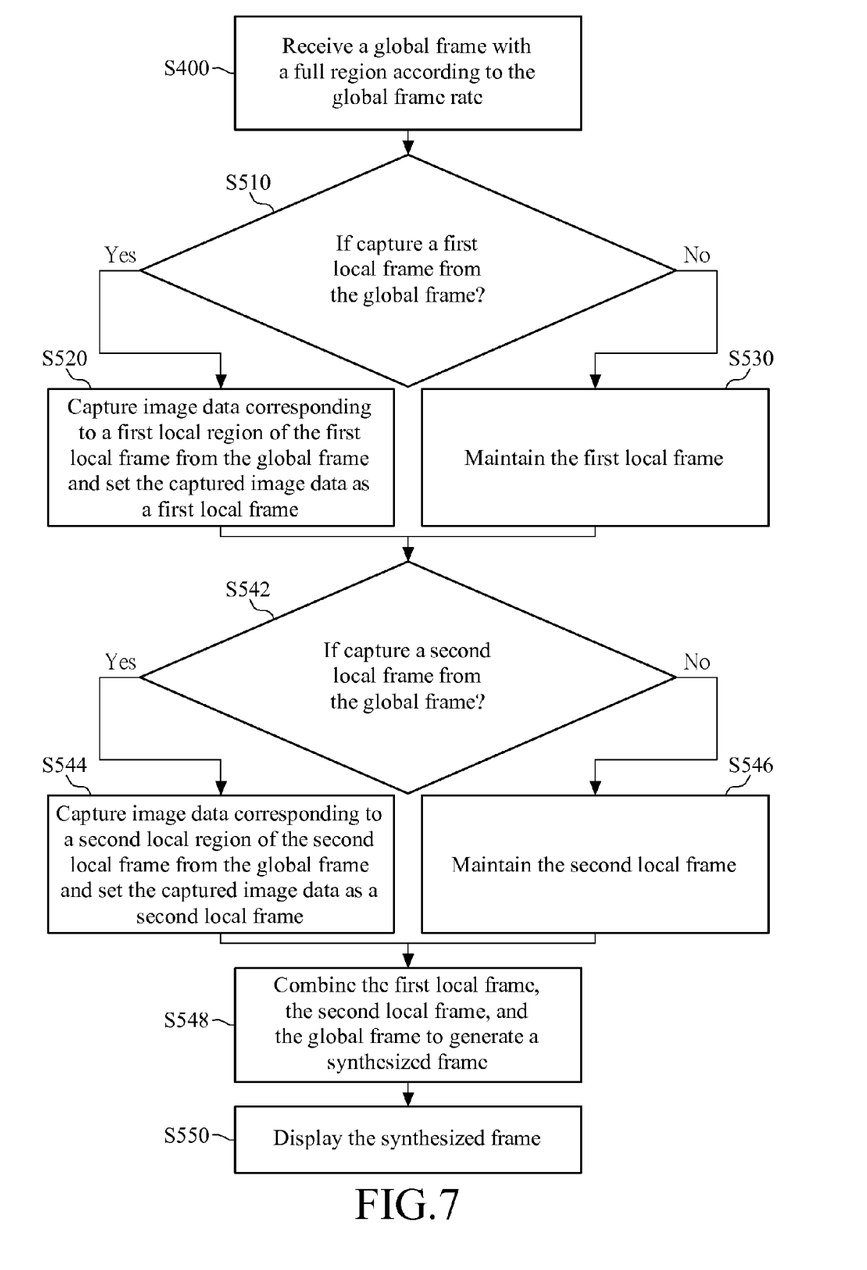
FIG. 7 is a flow chart of other video displaying method in one embodiment.

FIG. 7 is a flow chart of other video displaying method in one embodiment. To combine the first local frame and the global frame to generate the synthesized frame as shown in step S540 may include the following steps. First, as shown in S542, according to a second local frame rate, determine whether to capture a second local frame from the global frame. When to capture the second local frame from the global frame is determined according to the second local frame rate, image data corresponding to the second local region may be captured from the global frame and become the second local frame, as shown in step S544. When not to capture the second local frame from the global frame is determined according to the second local frame rate, the second local frame may be maintained, as shown in step S546. Subsequently, combine the first local frame, the second local frame, and the global frame to generate the synthesized frame, as shown in step S548.

Steps S542, S544 and S546 in FIG. 7 may respectively be similar to steps S250, S260 and S270 in FIG. 3, and thus are not repeated hereinafter. In step S548, to combine the first local frame, the second local frame, and the global frame to generate the synthesized frame may be based on the first local region, the second local region, and the full region. The processor 120 may read image data of the first local frame from the buffer 130 and combine the image data of the first local frame, the image data of the second local frame, and the image data of the global frame to generate the synthesized frame.

After the processor 120 generates the synthesized frame, the processor 120 may selectively send the synthesized frame to the displayer 140 and store the synthesized frame in the storage device 150. Alternately, the processor may selectively only store the synthesized frame in the storage device 150 but not send the synthesized frame to the displayer 140. The amount of local frames may be set according to users' actual requirements.

Figure 8:
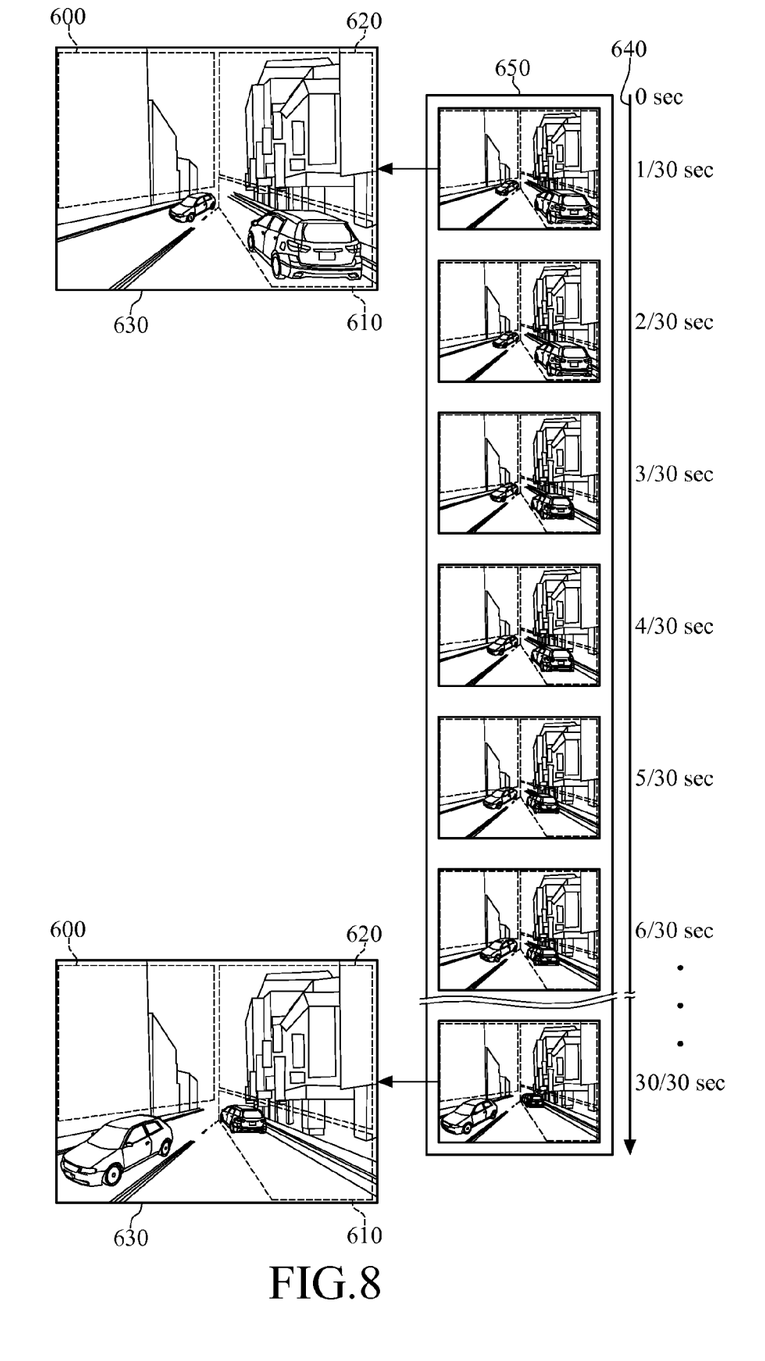
FIG. 8 illustrates a schematic example in one embodiment.

FIG. 8 illustrates an schematic example in one embodiment which shows a first local frame 600, a second local frame 610, a third local frame 620, an global frame 630, a time line 640, and video composition 650. In this embodiment, the first local frame 600, the second local frame 610, and the third local frame 620 may be trapezoidal. In some embodiments, the first local frame 600, the second local frame 610, and the third local frame 620 may be irregular-shaped. For example, the global frame rate of the global frame 630 may be 30 fps, the first local frame rate of the first local frame 600 and the third local frame rate of the third local frame 620 may be 10 fps, and the second local frame rate of the second local frame 610 may be 15 fps.

As follows, take an exemplary embodiment to illustrate the video processing method along the time line 640. Since some steps applied to the video composition 650 along the time line 640 may match the video processing method in FIG. 4 and not be repeated hereinafter, only the other steps in the video displaying method in FIG. 7 may be described in detail. The video composition 650 as a piece of image data may be made up of many pictures, and each picture may be a captured frame along the time line 640. In this embodiment, one thirtieth of a second may be taken an interval between two frames in the video composition 340. Each captured frame in the video composition 650 may be a frame every one thirty of a second, but the disclosure will not be limited thereto.

First, when the video capturing device 110 starts to record image data, the processor 120 may receive image data of the first local frame 600, the second local frame 610, the third local frame 620 and the global frame 630 captured by the video capturing device 110, and the video capturing device 110 may provisionally store the image data of the first local frame 600, the second local frame 610, the third local frame 620 and the global frame 630 in the buffer 130.

Then, the processor 120 may combine the image data of the first local frame 600, the second local frame 610, the third local frame 620 and the global frame 630 to generate an initial synthesized frame. Next, the processor 120 may send the initial synthesized frame to the displayer 140 or store the initial synthesized frame in the storage device 150 according to its setting. The displayer 140 may directly show the synthesized frame at first second to users. The storage device 150 may store the synthesized frame at first second and allow users to watch the stored image data within users' discretion.

Then, proceed to one thirtieth of a second along the time line 640, two thirtieth of a second, three thirtieth of a second, and the following several seconds, one captured frame in the video composition 650 may be obtained every one thirtieth of a second. The processor 120 may use the video processing method and the video displaying method to generate a synthesized frame. Next, the processor 120 may send the synthesized frame at one thirtieth of a second, the synthesized frame at two thirtieth of a second, the synthesized frame at three thirtieth of a second, and the synthesized frames at the following several seconds to the displayer 140 according to the setting or may store these synthesized frames in the storage device 150. To clearly describe the disclosure, this embodiment takes the first local frame, the second local frame, and the third local frame to be an example, but in the disclosure, more than two local frames may be applied. Moreover, the first local frame, the second local frame, and the third local frame may be set to have different image qualities for image capturing. Accordingly, a local frame with a higher image quality may be capable of being applied to the image region to be clearly captured.

In conclusion, through the video processing method, the video displaying method, and the video processing device in the disclosure, image data in the local region of the local frame may be shown clearly. The disclosure may also be capable of providing a better image quality without the decrease of the available recording time caused by the stored image data with a too large size. The disclosure may be capable of storing image data with a better image quality and a longer time length than before.

On the other hand, the amount of local frames, the shape, location and capturing frequency of each local frame may be set according to users' actual requirements, and the image quality of each local frame may be adjusted according to the actual environment. While the setting is so flexible, the convenience in using the EDR may still increase. The disclosure may allow a user to adjust the amount of local frames and the region of the local frame according to varied situations, thereby increasing the flexibility and easiness in using the EDR.

What is claimed is:

1. A video processing method, comprising:
 receiving an global frame according to a global frame rate;
 determining whether to capture a first local frame from the global frame, according to a first local frame rate of the first local frame which is different from the global frame rate; and
 combining the first local frame and the global frame to generate a synthesized frame.

2. The video processing method according to claim 1, wherein when to capture the first local frame from the global frame is determined by the first local frame rate, image data corresponding to a first local region of the first local frame is captured from the global frame and becomes the first local frame; otherwise, the image data of the first local frame is remained without changes.

3. The video processing method according to claim 2, wherein the first local region is smaller than or equal to a full region of the global frame.

4. The video processing method according to claim 3, wherein the step of combining the first local frame and the global frame to generate the synthesized frame is based on the first local region and the full region.

5. The video processing method according to claim 2, wherein the step of determining whether to capture the first local frame from the global frame comprises:
 determining to capture the first local frame from the global frame when a first time point related to the first local frame rate matches a system time point related to the global frame rate.

6. The video processing method according to claim 1, wherein before the first local frame and the global frame are synthesized, the video processing method further comprises:
 according to a second local frame rate of a second local frame, determining whether to capture the second local frame from the global frame;
 if yes, capturing image data corresponding to a second local region of the second local frame from the global frame, and setting the captured image data as the second local frame;
 if not, maintaining the second local frame; and
 combining the first local frame, the second local frame, and the global frame to generate the synthesized frame.

7. The video processing method according to claim 6, wherein the step of determining whether to capture the second local frame from the global frame comprises:
 determining to capture the second local frame from the global frame when a second time point related to the second local frame rate matches a system time point related to the global frame rate.

8. A video displaying method, comprising:
 receiving a global frame with a full region according to a global frame rate; and
 displaying a synthesized frame according to the global frame rate, wherein the synthesized frame comprises a first local frame with a first local frame rate and a first local region, the first local frame rate is different from the global frame rate, and the synthesized frame is generated according to the first local region and the full region;
 wherein the step of displaying the synthesized frame according to the global frame rate comprises:
 by the first local frame rate, determining whether to capture the first local frame from the global frame;
 combining the first local frame and the global frame to generate the synthesized frame; and
 displaying the synthesized frame.

9. The video displaying method according to claim 8, wherein when to capture the first local frame from the global frame is determined by the first local frame rate, image data corresponding to the first local region is captured from the global frame to become the first local frame; otherwise, the image data of the first local frame is remained without changes.

10. The video displaying method according to claim 9, wherein when a first time point related to the first local frame rate matches a system time point related to the global frame rate, to capture the first local frame from the global frame is determined.

11. The video displaying method according to claim 8, wherein the step of combining the first local frame and the global frame to generate the synthesized frame is based on the first local region and the full region.

12. The video displaying method according to claim 8, wherein the step of combining the first local frame and the global frame to generate the synthesized frame comprises:
 according to a second local frame rate of a second local frame, determining whether to capture the second local frame from the global frame;
 if yes, capturing image data corresponding to a second local region of the second local frame from the global frame, and setting the captured image data as the second local frame;
 if not, maintaining the second local frame; and
 generating the synthesized frame by combining the first local frame, the second local frame, and the global frame.

13. The video displaying method according to claim 12, wherein when a second time point related to the second local frame rate matches a system time point related to the global frame rate, to capture the second local frame from the global frame is determined.

14. A video processing device, comprising:
- a video capturing device for capturing an global frame;
- a processor for determining whether to capture a first local frame from the global frame, according to a first local frame rate of the first local frame and combining the global frame and the first local frame to generate a synthesized frame;
- a buffer for receiving image data which corresponds to the first local frame, from the processor and storing the image data; and
- a displayer for displaying the synthesized frame.

15. The video processing device according to claim 14, wherein when the processor determines to capture the first local frame by the first local frame rate, the processor captures the image data corresponding to a first local region from the global frame sets the image data as the first local frame, and stores the image data in the buffer.

16. The video processing device according to claim 15, wherein when the processor determines not to capture the first local frame by the first local frame rate, the first local frame is maintained without changes.

17. The video processing device according to claim 16, wherein when combining the first local frame and the global frame to generate the synthesized frame, the processor reads the image data corresponding to the first local frame from the buffer and then combines the image data and the global frame to generate the synthesized frame.

18. The video processing device according to claim 14, wherein when a first time point related to the first local frame rate matches a system time point related to a global frame rate, the processor determines to capture the first local frame from the global frame.

19. The video processing device according to claim 14, wherein when combining the first local frame and the global frame to generate the synthesized frame, the processor further determines whether to capture a second local frame from the global frame, according to a second local frame rate of the second local frame;
- if yes, the processor captures the image data in the global frame and sets the image data as the second local frame according to a second local region of the second local frame;
- if not, the processor maintains the second local frame without changes; and
- the processor combines the first local frame, the second local frame, and the global frame to generate the synthesized frame.

20. The video processing device according to claim 19, wherein when a second time point related to the second local frame rate matches a system time point related to the global frame rate, the processor determines to capture the second local frame from the global frame.

* * * * *